US012539922B2

(12) United States Patent
Vollmer et al.

(10) Patent No.: US 12,539,922 B2
(45) Date of Patent: Feb. 3, 2026

(54) SEALING PLUG

(71) Applicant: ILLINOIS TOOL WORKS INC., Glenview, IL (US)

(72) Inventors: Gerit Vollmer, Linden (DE); Jan Müller, Würzburg (DE); Albert Sbongk, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 115 days.

(21) Appl. No.: 17/974,169

(22) Filed: Oct. 26, 2022

(65) Prior Publication Data
US 2023/0138131 A1 May 4, 2023

(30) Foreign Application Priority Data

Oct. 29, 2021 (DE) .................. 10 2021 128 356.6
Oct. 13, 2022 (DE) .................. 10 2022 126 780.6

(51) Int. Cl.
*B62D 25/24* (2006.01)
*B60R 13/08* (2006.01)

(52) U.S. Cl.
CPC .................... *B62D 25/24* (2013.01)

(58) Field of Classification Search
CPC ....... B60R 13/0815; B60R 1/025; B60R 1/04; B60R 1/06; B60R 1/0602; B60R 1/0612; B60R 1/08; B60R 1/082; B60R 1/083; B60R 1/084; B60R 1/085; B60R 1/088; B60R 1/12; B60R 1/1207; B60R 1/26; B60R 11/02; B60R 11/0235; B60R 11/0241; B60R 11/0247; B60R 11/04; B60R 11/06; B60R 13/00; B60R 13/02; B60R 13/0206; B60R 13/0243; B60R 13/025; B60R 13/04; B60R 13/06; B60R 13/07; B60R 13/08; B60R 13/083; B60R 13/0892; B60R 13/10; B60R 15/00; B60R 15/04; B60R 16/02; B60R 16/0207; B60R 16/0215; B60R 16/0222; B60R 16/0238;
(Continued)

(56) References Cited

U.S. PATENT DOCUMENTS 5,267,667 A * 12/1993 Cozzani ............... B29C 66/112
220/302
5,852,854 A * 12/1998 Pierrot ............. B29C 66/12469
24/297
(Continued)

FOREIGN PATENT DOCUMENTS

CN 1124968 A * 6/1996 ............ B65D 39/00
CN 206938651 U 1/2018
(Continued)

*Primary Examiner* — Anthony D Stashick
*Assistant Examiner* — Marcos Javier Rodriguez Molina
(74) *Attorney, Agent, or Firm* — THOMPSON HINE LLP

(57) ABSTRACT

A sealing plug is provided for closing holes in objects, in particular for closing holes in motor vehicles or in components of motor vehicles. The sealing plug includes a base wall and at least one first circumferential side wall connected thereto, wherein the sealing plug is formed at least in regions from a thermoplastic adhesive material based on styrene-ethylene-butylene-styrene (SEBS) such that the material is carbonated at a temperature of up to 600° C. such that the sealing plug remains dimensionally stable and elastic.

11 Claims, 3 Drawing Sheets

(58) Field of Classification Search
CPC . B60R 16/0239; B60R 16/03; B60R 16/0315; B60R 16/033; B60R 19/023; B60R 19/42; B60R 19/48; B60R 19/52; B60R 2001/1215; B60R 2001/1223; B60R 2001/123; B60R 2001/1253; B60R 2001/1284; B60R 2011/0026; B60R 2011/0033; B60R 2011/004; B60R 2011/0052; B60R 2013/0287; B60R 2021/0046; B60R 2021/01006; B60R 2021/01272; B60R 2021/23382; B60R 2021/2395; B60R 2021/26029; B60R 2021/26076; B60R 2021/26094; B60R 2021/2633; B60R 2021/2648; B60R 2021/2765; B60R 2022/4642; B60R 2022/4661; B60R 2022/468; B60R 21/04; B60R 21/045; B60R 21/16; B60R 21/20; B60R 21/217; B60R 21/232; B60R 21/2338; B60R 21/239; B60R 21/26; B60R 21/261; B60R 21/264; B60R 21/2644; B60R 21/268; B60R 21/272; B60R 21/274; B60R 21/38; B60R 22/1952; B60R 22/1954; B60R 22/1955; B60R 22/28; B60R 22/4619; B60R 22/4628; B60R 22/4633; B60R 2300/108; B60R 2300/8026; B60R 2300/8093; B60R 25/043; B60R 3/002; B60R 3/02; B60R 9/058; B62D 1/04; B62D 21/07; B62D 21/09; B62D 21/10; B62D 21/17; B62D 21/20; B62D 23/005; B62D 25/02; B62D 25/04; B62D 25/06; B62D 25/20; B62D 25/24; B62D 27/023; B62D 27/026; B62D 27/065; B62D 29/001; B62D 29/005; B62D 29/04; B62D 29/043; B62D 31/00; B62D 33/04; B62D 33/046; B62D 33/077; B62D 39/007; B62D 53/00; B62D 53/0842; B62D 63/025; B62D 65/024; B62D 65/04; B65D 1/0238; B65D 1/04; B65D 1/16; B65D 11/06; B65D 11/08; B65D 17/06; B65D 17/506; B65D 2203/00; B65D 2251/023; B65D 2251/06; B65D 23/102; B65D 25/20; B65D 25/30; B65D 25/48; B65D 2517/0038; B65D 2539/003; B65D 2539/005; B65D 2539/006; B65D 2539/008; B65D 2543/00092; B65D 2543/00231; B65D 2543/00296; B65D 2543/00407; B65D 2543/00416; B65D 2543/005; B65D 2543/00509; B65D 2543/00518; B65D 2543/00537; B65D 2543/00546; B65D 2543/00555; B65D 2543/00972; B65D 2543/0099; B65D 3/10; B65D 31/00; B65D 35/28; B65D 39/00; B65D 39/0005; B65D 39/0011; B65D 39/0023; B65D 39/0029; B65D 39/0041; B65D 39/0052; B65D 39/0058; B65D 39/007; B65D 39/02; B65D 39/04; B65D 39/08; B65D 39/10; B65D 39/12; B65D 41/0414; B65D 41/28; B65D 41/3447; B65D 43/0218; B65D 43/022; B65D 43/0231; B65D 43/08; B65D 45/00; B65D 45/16; B65D 45/18; B65D 45/32; B65D 47/043; B65D 47/06; B65D 47/063; B65D 47/121; B65D 47/42; B65D 5/706; B65D 5/727; B65D 51/00; B65D 51/08; B65D 51/14; B65D 51/145; B65D 51/1611; B65D 51/1616; B65D 51/245; B65D 51/248; B65D 53/00; B65D 55/00; B65D 59/00; B65D 59/02; B65D 59/06; B65D 65/06; B65D 65/38; B65D 65/466; B65D 71/06; B65D 75/58; B65D 81/3294; B65D 83/20; B65D 83/202; B65D 83/205; B65D 83/30; B65D 83/32; B65D 83/46; B65D 83/48; B65D 83/54; B65D 83/685; B65D 83/756; B65D 85/00; B65D 85/04; B65D 85/8043; B65D 88/74; B65D 90/02; B65D 90/06; B65D 90/08; B65D 90/34; B65D 1/00; B65D 1/02; B65D 1/0223; B65D 1/0246; B65D 1/0292; B65D 1/06; B65D 1/10; B65D 1/20; B65D 1/34; B65D 1/40; B65D 1/44; B65D 17/34; B65D 17/42; B65D 2203/10; B65D 2203/12; B65D 2205/02; B65D 2215/02; B65D 2231/00; B65D 2251/0003; B65D 2251/0015; B65D 2251/0018; B65D 2251/0025; B65D 2251/0028; B65D 2251/005; B65D 2251/0056; B65D 2251/0075; B65D 2251/0078; B65D 2251/0081; B65D 2251/0087; B65D 2251/009; B65D 2251/0093; B65D 2251/02; B65D 2251/026; B65D 2251/1016; B65D 2251/1058; B65D 2251/1066; B65D 2251/20; B65D 2251/205; B65D 2255/00; B65D 2255/20; B65D 23/00; B65D 23/06; B65D 23/08; B65D 23/104; B65D 23/108; B65D 23/12; B65D 23/14; B65D 2401/00; B65D 2401/10; B65D 2401/15; B65D 2401/20; B65D 2401/25; B65D 2401/35; B65D 25/00; B65D 25/02; B65D 25/04; B65D 25/08; B65D 25/10; B65D 25/107; B65D 25/205; B65D 25/24; B65D 25/28; B65D 25/2826; B65D 25/2841; B65D 25/2894; B65D 25/38; B65D 25/40; B65D 25/52; B65D 25/54; B65D 2501/0027; B65D 2517/004; B65D 2525/283; B65D 2539/001; B65D 2543/00046; B65D 2543/00277; B65D 2543/0049; B65D 2543/00564; B65D 2543/00629; B65D 2543/00685; B65D 2543/0074; B65D 2543/00796; B65D 2543/00851; B65D 2543/00953; B65D 2547/06; B65D 2575/586; B65D 2590/046; B65D 33/00; B65D 33/14; B65D 33/16; B65D 33/1633; B65D 35/44; B65D 37/00; B65D 39/0035; B65D 39/0076; B65D 39/082; B65D 39/084; B65D 39/086; B65D 39/088; B65D 39/16; B65D 41/00; B65D 41/023; B65D 41/04; B65D 41/0407; B65D 41/0421; B65D 41/0428; B65D 41/0435; B65D 41/0442; B65D 41/045; B65D 41/0471; B65D 41/0478; B65D 41/0485; B65D 41/06; B65D 41/065; B65D 41/08; B65D 41/083; B65D 41/086; B65D 41/12; B65D 41/125; B65D 41/16; B65D 41/17; B65D 41/185; B65D 41/20; B65D 41/30; B65D 41/32; B65D 41/325; B65D 41/34; B65D 41/3404; B65D 41/3409;

B65D 41/3423; B65D 41/3428; B65D
41/3442; B65D 41/40; B65D 41/42;
B65D 41/44; B65D 41/46; B65D 41/48;
B65D 41/58; B65D 41/62; B65D
43/0212; B65D 43/0229; B65D 43/16;
B65D 43/161; B65D 43/164; B65D
43/165; B65D 43/22; B65D 43/26; B65D
45/025; B65D 45/20; B65D 45/322;
B65D 45/327; B65D 47/00; B65D 47/04;
B65D 47/08; B65D 47/0842; B65D
47/0857; B65D 47/0861; B65D 47/0885;
B65D 47/089; B65D 47/122; B65D
47/20; B65D 47/2006; B65D 47/2037;
B65D 47/205; B65D 47/2056; B65D
47/246; B65D 47/247; B65D 47/268;
B65D 47/286; B65D 49/04; B65D 49/08;
B65D 50/041; B65D 50/043; B65D
51/002; B65D 51/005; B65D 51/16;
B65D 51/1644; B65D 51/1683; B65D
51/1688; B65D 51/22; B65D 51/226;
B65D 51/242; B65D 51/2828; B65D
51/2835; B65D 51/32; B65D 53/02;
B65D 55/02; B65D 55/024; B65D 55/08;
B65D 55/0827; B65D 65/40; B65D
75/5877; B65D 75/0486; B65D 77/06;
B65D 77/067; B65D 81/05; B65D
81/052; B65D 81/2038; B65D 81/24;
B65D 81/267; B65D 81/268; B65D
81/3233; B65D 81/325; B65D 81/36;
B65D 81/3806; B65D 81/3818; B65D
81/3841; B65D 81/3872; B65D 83/00;
B65D 83/04; B65D 83/14; B65D 83/164;
B65D 83/206; B65D 83/345; B65D
83/425; B65D 83/44; B65D 83/62; B65D
83/70; B65D 83/7532; B65D 85/20;
B65D 85/72; B65D 85/8055; B65D
85/8061; B65D 88/12; B65D 88/48;
B65D 88/54; B65D 88/64; B65D 88/76;
B65D 90/00; B65D 90/041; B65D
90/048; B65D 90/105; B65D 90/18;
B65D 90/38; B65D 90/503; B65D 90/54;
B65D 90/545; B65D 90/66; B65D
1/0207; B65D 1/023; B65D 1/42; B65D
11/1873; B65D 17/502; B65D 21/0228;
B65D 21/0233; B65D 21/00; B65D
2203/04; B65D 2205/025; B65D 2215/06;
B65D 2221/00; B65D 2231/005; B65D
2231/02; B65D 2251/0031; B65D
2251/10; B65D 2251/1008; B65D
2251/1041; B65D 2251/105; B65D
2251/1075; B65D 2251/1083; B65D
2255/06; B65D 23/0871; B65D 23/0878;
B65D 2401/05; B65D 2401/30; B65D
25/108; B65D 25/14; B65D 25/2811;
B65D 25/2897; B65D 25/44; B65D
2501/0018; B65D 2501/0081; B65D
2517/0013; B65D 2517/0041; B65D
2517/0067; B65D 2517/0071; B65D
2517/0098; B65D 2517/5029; B65D
2517/5086; B65D 2517/5091; B65D
2543/00027; B65D 2543/00074; B65D
2543/00527; B65D 2543/00638; B65D
2543/00805; B65D 2543/00814; B65D
2543/00898; B65D 2543/00907; B65D
2547/066; B65D 2565/388; B65D
2577/043; B65D 2583/0481; B65D
2585/545; B65D 33/2508; B65D 33/2541;
B65D 35/08; B65D 35/22; B65D 35/24;
B65D 35/242; B65D 35/32; B65D 35/38;
B65D 35/40; B65D 35/46; B65D 35/56;
B65D 41/005; B65D 41/02; B65D
41/0464; B65D 41/0492; B65D 41/145;
B65D 41/165; B65D 41/18; B65D 41/26;
B65D 41/3414; B65D 41/3433; B65D
41/3457; B65D 41/348; B65D 41/3495;
B65D 41/38; B65D 41/485; B65D 43/00;
B65D 43/02; B65D 43/0202; B65D
43/0214; B65D 43/0225; B65D 43/0235;
B65D 43/0258; B65D 43/0274; B65D
43/12; B65D 43/162; B65D 43/163;
B65D 43/169; B65D 43/18; B65D 43/20;
B65D 45/02; B65D 45/24; B65D 47/046;
B65D 47/061; B65D 47/066; B65D
47/068; B65D 47/0804; B65D 47/0809;
B65D 47/0819; B65D 47/0828; B65D
47/0838; B65D 47/0847; B65D 47/0866;
B65D 47/0871; B65D 47/0876; B65D
47/0895; B65D 47/10; B65D 47/103;
B65D 47/106; B65D 47/12; B65D
47/123; B65D 47/127; B65D 47/128;
B65D 47/141; B65D 47/142; B65D
47/147; B65D 47/2012; B65D 47/2031;
B65D 47/2062; B65D 47/2068; B65D
47/2075; B65D 47/241; B65D 47/242;
B65D 47/244; B65D 47/248; B65D
47/249; B65D 47/265; B65D 47/283;
B65D 47/30; B65D 47/305; B65D 47/32;
B65D 47/36; B65D 47/40; B29C
65/4815; B60B 1/041; B60B 1/043; B60B
21/02; B60B 21/04; B60B 21/062; B60B
21/12; B60B 23/00; B60B 5/02; B60C
1/00; B60C 1/0008; B60C 1/0016; B60C
1/0025; B60C 11/00; B60C 13/00; B60C
15/0009; B60C 15/04; B60C 15/06; B60C
15/0603; B60C 17/0009; B60C 17/0036;
B60C 17/06; B60C 17/103; B60C 17/106;
B60C 19/12; B60C 19/122; B60C
2005/145; B60C 2009/0035; B60C
2009/0092; B60C 2009/0215; B60C
2009/045; B60C 2009/0458; B60C
2009/0466; B60C 2015/009; B60C
2015/048; B60C 2015/061; B60C
2015/0614; B60C 2015/0617; B60C
2015/0621; B60C 2015/0639; B60C
2017/0072; B60C 2017/0081; B60C
23/04; B60C 5/14; B60C 5/142; B60C
9/0042; B60C 9/005; B60C 9/02; B60C
9/0207; B60C 9/08; B60C 9/09; B60C
9/18; B60J 10/30; B60J 10/75; B60J
10/80; B60K 2001/0438; B60N 3/08;
F16J 13/12; F16J 13/14; F16J 15/022;
F16J 15/025; F16J 15/04
USPC ..... 220/789, 200, 203.07, 203.28, 212, 214,
220/216, 222, 23.2, 23.88, 232, 233, 234,
220/235, 236, 237, 240, 242, 243, 244,
220/246, 253, 254.4, 254.5, 254.8, 254.9,
220/256.1, 257.1, 257.2, 259.3, 259.4,
220/260, 264, 265, 266, 268, 269, 274,
220/276, 284, 288, 293, 295, 296, 300,
220/301, 302, 303, 304, 314, 315, 319,

220/324, 326, 327, 328, 345.6, 359.1,
220/359.3, 363, 367.1, 375, 378, 4.01,
220/4.12, 495.06, 500, 525, 562, 565,
220/581, 586, 592.17, 592.2, 592.25,
220/592.27, 600, 601, 661, 713, 714, 715,
220/720, 725, 780, 782, 783, 788

See application file for complete search history.

(56) References Cited

U.S. PATENT DOCUMENTS

| | | | |
|---|---|---|---|
| 6,319,436 | B1 | 11/2001 | Jaeger |
| 7,114,632 | B2 | 10/2006 | Kraus |
| 2007/0108216 | A1* | 5/2007 | Kurth ................ B60R 13/0206 220/789 |
| 2015/0135598 | A1 | 5/2015 | Jatzke |
| 2016/0068314 | A1* | 3/2016 | Jatzke ................ B65D 45/16 220/305 |
| 2016/0244104 | A1* | 8/2016 | Kuhm .................. B62D 25/24 |
| 2017/0152948 | A1* | 6/2017 | Huebner .............. B62D 25/24 |

FOREIGN PATENT DOCUMENTS

| | | | | | |
|---|---|---|---|---|---|
| CN | 112145687 | A | * | 12/2020 | ............ F16B 21/08 |
| DE | 20107612 | U1 | | 10/2001 | |
| DE | 102004018047 | A1 | | 11/2005 | |
| DE | 102007018667 | A1 | * | 10/2008 | ............ B62D 25/24 |
| DE | 102009057750 | A1 | | 12/2010 | |
| DE | 102019122038 | A1 | | 2/2021 | |
| EP | 0733558 | A1 | * | 9/1996 | ............ B65D 39/00 |
| EP | 2271540 | B1 | | 1/2011 | |
| EP | 2781806 | A1 | | 9/2014 | |
| EP | 2810855 | A1 | | 12/2014 | |
| EP | 2873894 | A1 | | 5/2015 | |
| EP | 3778356 | A1 | * | 2/2021 | ............ F16J 15/102 |
| EP | 3816022 | A1 | * | 5/2021 | ............ B62D 25/24 |
| ES | 2761348 | A1 | * | 5/2020 | ............ B62D 25/24 |
| FR | 2507277 | A1 | * | 12/1982 | ............ B62D 25/24 |
| JP | 6159067 | B2 | | 7/2017 | |
| WO | WO-2016180639 | A1 | * | 11/2016 | ............ B62D 25/24 |

* cited by examiner

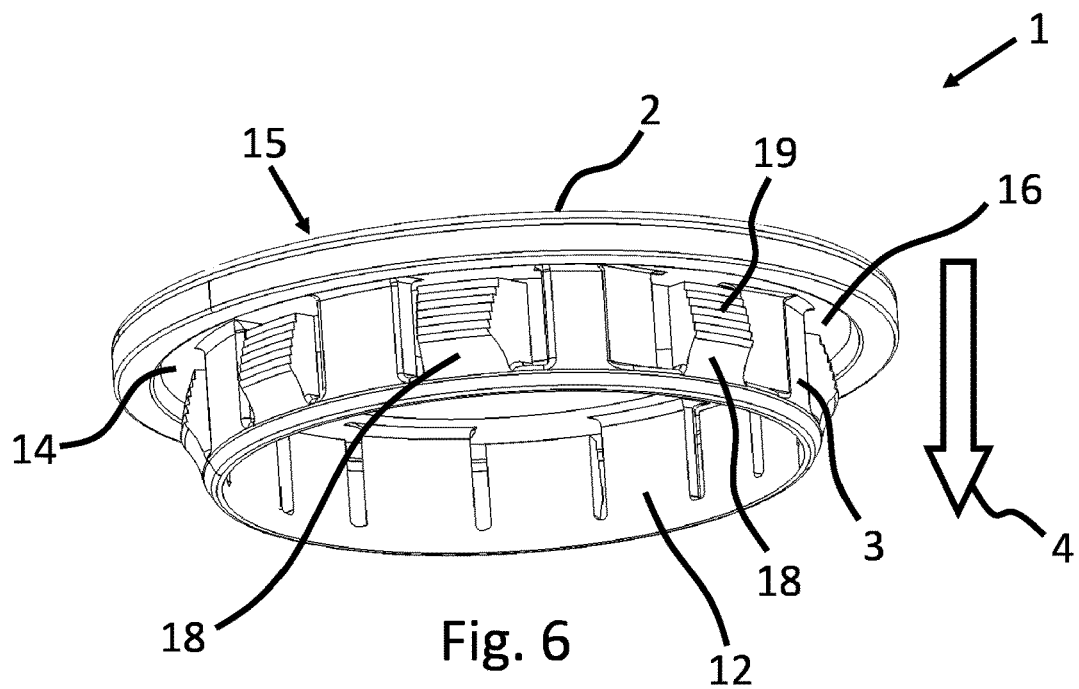
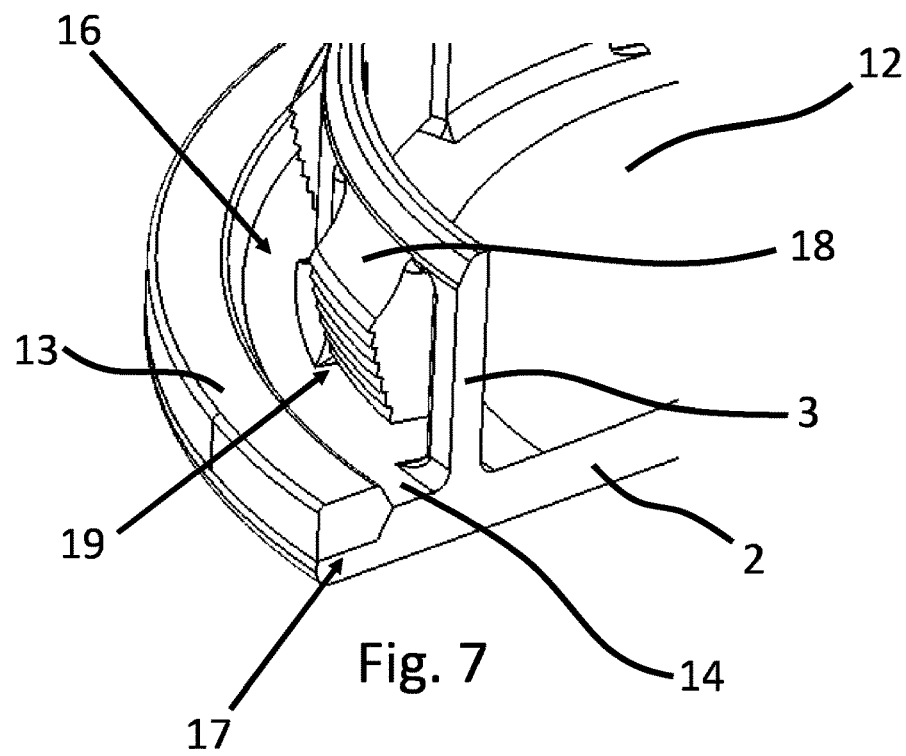

SEALING PLUG

TECHNICAL FIELD

According to the invention, a sealing plug is provided for closing holes in objects, in particular for closing holes in motor vehicles or in components of motor vehicles, as well as a method for producing such sealing plugs.

BACKGROUND

In electric vehicles, the batteries are separated from the passenger compartment via the underbody (above the batteries or accumulators) (and/or a battery case). At least one or more openings are formed in the underbody, which openings are closed by means of a corresponding sealing plug. When a battery blows out, thermoplastic gases will leak from the battery. The plugs must withstand these gases for 5 minutes so as not to put the occupants at risk.

First, no special sealing plugs were used in electric vehicles. Traditional 1K and 2K sealing plugs of vehicles having internal combustion engines have been adopted for electric vehicles.

Due to incidents, in particular fires, in connection with batteries, a new law (GB 38031-2020) on temperature requirements for sealing plugs of electric vehicles has been introduced in China, for example. It states that batteries are not allowed to catch fire for five minutes after the thermal blow-out of a battery cell.

In such a case, the driver of an electric vehicle should thus have at least five minutes to leave the vehicle.

In particular, in vehicle bodies, a plurality of holes and openings are provided so as to make vehicle cavities, such as the sills, accessible from the outside, in particular to make them accessible for the entry of corrosion protection agents.

Early in the manufacture of a motor vehicle, the body as a whole is typically subjected to phosphatation in a phosphating bath. A wash is then carried out in a cleaning bath, typically followed by a cataphoretic dip coating.

For all of these processes, it is necessary that the respective liquids also enter the cavities of a body. For this purpose, the body has openings, in particular holes, which are to be subsequently closed so as to prevent the entry of dirt and liquids.

Moreover, vehicle bodies also have holes that serve to accomplish the production process of alignment of individual body components until their integration into the overall body.

The known holes or openings are typically sealed with rubber-elastic plugs. For this purpose, typical rubber-elastic plugs have a central cavity in the form of a flat cup or bowl shaped region, which is delimited by a first side wall and a first one-sided terminating wall, which is customary in this region.

From an end of the side walls opposite the terminus, second walls typically extend diagonally outward, reaching for example to the height of the terminus, so that this wall region is formed in cross-section in an approximately V-shape and corresponds to a ring groove in the top plan view from the bottom side. A circumferential sealing lip typically extends outward from a free end of the outer wall, which lip rests on a body panel in the inserted state, while the circumferential wall which is V-shaped in cross-section penetrates the hole. In order to achieve an anchoring, an outwardly projecting step that is annular or arrow-like in cross-section or a catch element can also be provided on the outer wall, which prevents a sliding out from the opening.

U.S. Pat. No. 6,319,436 B1 discloses a sealing plug for closing an opening in a planar surface with a plurality of retaining hooks and a circumferential seal, wherein ribs extend from a bottom side of a transverse surface of the plug, which ribs are formed as guide elements upon insertion of the plug. Here, the plug is formed from a hard plastic.

A plug for closing holes in planar objects is known from JP 61-59067, wherein said plug is formed from an elastic material and has a first inner circumferential wall, which, in one embodiment, has an outer circumferential step and a sealing lip that interacts with the former, which means a hole can be closed accordingly. In addition, the plug can be formed as a wave in cross-section with a circumferential V-groove on the top side in which four ribs are formed.

From US 2015/0135598 A1, a rubber-elastic plug is known, which consists of a circumferential wall and a sealing lip formed from the former, wherein an inner, dome-like elevation is arranged on an inner circumferential surface of the wall, wherein the ceiling of the dome-like elevation is formed with ribs.

EP 2 810 855 A1 discloses a sealing plug for sealing an opening in a component. This comprises a substantially annular or cylindrical shaft, which is interrupted by ribs that are open to the outside and are hollow. Furthermore, a cone-shaped sealing lip is provided on the shaft, wherein at least one flexible folding zone is provided on the sealing lip, which is reversibly foldable such that, in a folded state of the folding zone, the circumference of the sealing lip in the region of the folding zone and/or an edge of the sealing lip is reduced.

EP 2 781 806 A1 discloses a plug for closing openings. This plug comprises a radially circumferential side wall as well as a sealing surface formed on the side wall, wherein struts can be provided in the region between the circumferential side wall. According to an exemplary embodiment, it can be provided in this case that the struts extend up to an annular element arranged concentrically to the circumferential side wall, or it is provided that the struts terminate in the region of a central actuation trough configured in the upper wall of the plug.

In DE 201 07 612 U1, a closing lid for closing an opening is disclosed. This closing lid comprises a base body with a circumferential collar that transitions into an elastic sealing lip that abuts one side of a beam. This closing cover can have struts that do not extend from one side of the collar or a radially circumferential side wall to the other. According to a further exemplary embodiment, the closing lid can have a grid-like stiffening structure, wherein corresponding interstices of the grid-like stiffening structure are foamed with PVC.

From EP 2 873 894 A1, a sealing plug for closing an opening is known. This comprises an annular sealing portion and a spreading portion configured integrally with the sealing portion. This sealing plug can also have struts that are delimited approximately at the center of the sealing plug by an element arranged concentrically to the annular sealing portion.

DE 10 2009 057750 A1 describes an apparatus for insertion into an opening of a component of an automobile. Here, a thermoplastic adhesive material is applied circumferentially on a flange, which, when heated, adhesively seals the flange to a component surface. The remaining regions of this apparatus are formed from a different plastic, wherein this apparatus can be produced by means of a 2-component injection molding process.

A sealing plug is described in CN 206 938 651 U, which is produced by means of a 2-component injection molding process, wherein a sealing portion can be formed from a thermoplastic adhesive material, and a base body is formed from a hard component. The sealing body can have an upper wall in the connecting region with the base body, which wall is formed by thin-walled struts in order to manufacture the base body 100 from the hard component and the sealing body from the thermoplastic adhesive material by means of the 2-component injection molding process and to connect them to one another.

Furthermore, grommet apparatus for the passage of lines are known, in particular for cable passage or also for passing fluid lines through a component opening.

One or more cables and, for example, also cable harnesses are generally guided through a plate of a carrier component, for example a body of a motor vehicle, using an EPDM grommet (grommet apparatus).

The main task of these grommets is to seal the respective body portions or housings against environmental factors (dust, moisture, noise), wherein simultaneous passage of one or more cables is permitted without damage to them.

Such grommets are provided to have a central opening for the passage of one or more cables, in particular also cable harnesses. When assembling onto a plate, these must be pressed in an annular manner in the edge region in an assembly direction in order to connect them to a body plate. Due to the repeated pressing, relatively high assembly forces are produced in order to achieve the desired sealing effect. Therefore, such EPDM grommets usually have a very high proportion of material in order to ensure sufficient stability during assembly.

SUMMARY

The problem of the present invention is to provide a sealing plug, in particular a high-temperature sealing plug, for closing holes in objects, preferably for closing holes in motor vehicles, in particular in the underbody; or in components of motor vehicles, for example battery housings, which allows for a sufficient closing of a hole, even at high temperatures.

A further problem of the present invention is to provide a sealing plug that offers an alternative to the sealing plugs as known from the prior art.

Yet another problem of the present invention is to provide a sealing plug that is safe and reliable in operation.

According to the invention, a sealing plug, in particular a high-temperature sealing plug, is provided for closing holes in objects, preferably for closing holes in motor vehicles or in components of motor vehicles, for example an underbody. This comprises a base wall and at least one first side wall connected thereto, preferably radially circumferential.

The present invention is characterized in that the sealing plug is formed at least in regions from a thermoplastic adhesive material based on styrene-ethylene-butylene-styrene (SEBS).

The thermoplastic adhesive material based on styrene-ethylene-butylene-styrene (SEBS) is preferably configured in order to carbonate the material at a temperature of up to 600° C. The sealing plug can remain dimensionally stable and/or elastic.

The sealing plug can comprise at least one radially circumferential annular connecting region for sealing and connecting to a hole-delimiting edge of a component, which region is formed from the thermoplastic adhesive material such that the sealing plug is formed from the thermoplastic adhesive material at least in this region.

The material can be carbonate from a temperature of at least 250° C. or 300° C. to a maximum of 350° C. or 400° C. or 450° C. or 500° C. or 550° C. or 600° C., accordingly. Firstly, a solution made of plastic for such a sealing plug for a temperature range of up to 600° C. does not appear to be possible, because even high-performance plastics have a maximum operating temperature of only 300°.

The inventors of the present invention have recognized that it is possible to ensure the tightness of an opening, for example of a component or a body, of an electric vehicle at high temperatures by using a thermoplastic adhesive material based on SEBS, in particular TPS (styrenic block copolymer), which only has an operating temperature of 100°. The finding of the present invention is, in particular, that such a material does not melt at higher temperatures, but rather carbonates with high dimensional stability. A corresponding hole is then reliably sealed at high temperatures by the carbonated high-temperature sealing plug, without a high emission of plastic vapors.

Other similar and known materials are disadvantageous in that they shrink at high temperatures and/or form cracks and/or holes or melt or burn and thus can no longer close a corresponding hole or through-opening in a gas-tight manner.

The sealing plug according to the invention, in particular a high-temperature sealing plug made of a thermoplastic adhesive material based on SEBS, is configured so as to carbonate the material at a temperature of up to 600°, such that the sealing plug does not melt and thus remains dimensionally stable and/or elastic. In this manner, it is safely and reliably avoided that the material shrinks and/or forms cracks and/or holes, melts, or burns and thus can no longer close a corresponding hole or through-opening in a gas-tight manner.

The aforementioned Chinese law has been incorporated into the requirement for the plugs between battery and passenger compartment by many vehicle manufacturers, and in particular vehicle suppliers. This means that the sealing plug according to the invention is configured in order to still allow a gas-tight sealing of a hole or an opening or a through-opening even after five minutes at 600° C. or even up to 700° C.

In the context of the present invention, the expressions "dimensionally stable" and "elastic" are understood to mean that the sealing plug is designed such that, even at temperatures up to 500° C. or 600° C. or 700° C., it can maintain a certain basic form or basic structure (dimensionally stable) and/or also adheres to or does not break away from the edge region of a component that delimits a through-opening (elastic) such that the corresponding through-opening is sealed in a gas-tight manner.

A thermoplastic adhesive material is a heat-activatable adhesive material (hot-melt material). Thermal activation can occur from about 120° C.

Styrene-ethylene-butylene styrene (SEBS) is a thermoplastic elastomer (TPE). SEBS behaves like rubber, without the need for vulcanization. SEBS is strong and flexible, has excellent heat and UV resistance, and is easy to process. It is produced by hydrogenation of styrene butadiene styrene copolymer (SBS), thereby improving thermal stability, weather resistance, and oil resistance. In particular, SEBS is solid, flexible, highly resistant to heat and UV, and easy to process.

Thermoplastic elastomers, referred to as styrenic block copolymers (TPS or TPE-S), are compounds based on SBS or SEBS. In fact, the words SBS or SEBS are often used in order to describe these compounds or composite materials, although they are actually raw materials.

SBS is based on two-phase block copolymers with hard and soft segments. The styrenic end blocks provide the thermoplastic properties, and the butadiene mid-blocks provide the elastomeric properties. SBS is a frequently produced TPS material and is often used in shoes, adhesives, and seals and handles with lower specifications, where chemical and aging resistance is not critical.

SBS becomes SEBS upon hydrogenation, because the elimination of the C═C bonds in the butadiene component results in ethylene and butylene in the mid-block, hence the acronym SEBS. SEBS is characterized by improved heat resistance, mechanical properties, and chemical resistance.

The sealing plug according to the invention can in particular be used as an assembly plug or as a painting plug or be configured for this purpose.

In the context of the present invention, a grommet apparatus can also be considered a sealing plug. Such a grommet device is described, for example, in the as yet unpublished patent application with the application number DE 10 2021 118 919.5, to which reference is hereby made in full.

Fibers for increasing dimensional stability can be embedded into the material or matrix material of the sealing plug according to the invention.

The matrix or matrix material surrounds the fibers, which are bound to the matrix by adhesive interaction. Through the use of fibrous materials, fiber-plastic composites have a direction-dependent elasticity behavior.

Without a matrix material, the high specific strengths and stiffnesses of the reinforcing fibers are less useful. This is possible, in particular, due to the suitable combination of fiber and matrix material.

In general, any suitable inorganic or organic reinforcing fibers as well as natural fibers can be provided. The provision of corresponding reinforcing fiber bundles or yarns is also possible here. In addition, both short fibers and long fibers or continuous fibers can be provided.

In particular, the material can be a thermoplastic elastomer, such as TPS or TPE based on SEBS, and can have adhesive properties. In addition, a TPE can also be provided in conjunction with polyphenylene oxide (PPO), which also functions by carbonating. The aromatic ingredients that favor carbonation are decisive.

Thus, the sealing plug according to the invention can be made of TPS or TPE based on SEBS with corresponding fibers and corresponding adhesive properties.

The fibers in the material ensure a very good dimensional stability, even at high temperatures.

The adhesive properties of the material prevent the sealing plug, in particular a corresponding sealing lip of the sealing plug, from detaching from the region of the component that delimits the through-opening, in particular a body structure, preferably an underbody, because the fusing can withstand temperatures of up to 500° C. The same applies when the high-temperature sealing plug is configured as a simple sealing plug or as an assembly plug.

Due to the adhesive properties, the sealing plug is held in place, and the adhesive properties simultaneously serve as a connection between the fibers.

Like other plastics, the high-temperature sealing plug according to the invention shrinks slightly during carbonation at temperatures up to 500° C. Nevertheless, the material properties shown above are sufficient to close a corresponding opening in a gas-tight manner.

According to a first and a second exemplary embodiment, the sealing plug can be formed entirely from the thermoplastic adhesive material.

The base wall and the side wall can form a bowl shape that delimits a cavity.

A stiffening structure can be arranged in this cavity.

The stiffening structure can comprise at least one and preferably a plurality of radially circumferential stiffening ribs, which are equally spaced apart from one another and extend through the cavity and connect diametrically opposite wall region[s] of the first side wall to one another.

Due to the bowl-shaped configuration and the corresponding stiffening ribs, the sealing plug has a higher stiffness. This is not only ensured during assembly, but also in particular during deformation due to temperatures of up to 500° C.

The stiffening ribs can have a uniform height over their radial extension, a height decreasing or increasing radially outward, or a varying height from an axial center of the cavity to the circumferential first side wall.

Furthermore, the stiffening structure can comprise an annular stiffening rib arranged in the cavity concentrically to the first side wall.

The stiffness of the sealing plug is additionally increased by the concentric annular stiffening rib.

The first side wall can be connected to a radially circumferential second side wall, in particular integrally, wherein the two side walls are arranged concentrically to one another.

The first and second side walls can form stiffening walls. Due to such an inner and outer stiffening wall, a sealing plug is provided with significantly improved stability.

Furthermore, the first and second side walls can be connected to one another by struts in order to increase dimensional stability.

The first and second side walls preferably extend approximately parallel to an assembly direction.

In the context of the present invention, an "assembly direction" is understood to mean a direction in which a sealing plug, in particular a high-temperature sealing plug, can be inserted into a hole or a through-opening of a component in order to close it. The assembly direction thus extends approximately orthogonally to a region of a component that delimits such a through-opening.

The second side wall can comprise a radially circumferential sealing lip for sealing and adhesively connecting to a region of a component that delimits a component opening.

Due to its material properties, the sealing lip thus connects to the corresponding region of a component as a thermoplastic adhesive material.

The thermoplastic adhesive material of the sealing lip prevents the sealing lip from detaching from the sheet or a component, because the thermoplastic adhesive material is melted onto the sheet.

Furthermore, the sealing lip can preferably extend radially outward and obliquely in the assembly direction, wherein the sealing lip thus extends particularly in the assembly direction.

In a transition region between the side wall and the sealing lip, an undercut, radially circumferential recess can be formed.

It has been found that such an undercut recess significantly improves a connection of the sealing plug to a corresponding through-opening or to a region of a component that delimits the through-opening.

The undercut recess is approximately tapered or round in cross-section.

The first side wall and/or the second side wall and/or the base wall and/or the stiffening wall can have a thickness of at least 2 mm or 2.5 mm or 3 mm or 3.5 mm.

Despite the material of the sealing plug according to the invention, it shrinks slightly during carbonation at temperatures of up to 500° C. or up to 600° C. In order to counteract this behavior, the sealing plug is designed such that preferably all walls or at least one or more of the walls forming the sealing plug have a higher thickness compared to known sealing plugs. The stiffening ribs discussed above also contribute to this.

The sealing plug can be formed as a 1-piece component from a heat-activatable adhesive material having adhesive properties at higher temperatures of, for example, 110° C. to 195° C.

In particular, the sealing plug can be made from a heat-activatable adhesive material in a 1-component injection molding process.

Furthermore, according to the invention, a method for producing a sealing plug described above, in particular a high-temperature sealing plug, is disclosed, wherein the method is a 1-component injection molding method in which a shear required for melting SEBS is produced by an auger of an injection molding machine in order to melt the material.

Melting SEBS requires not only a specific temperature, but also a specific shear. This can be melted with the auger through an additional shear in an injection molding machine.

The use of SEBS provides the advantage, in particular, that temperatures of up to 500° C. or 600° C. do not cause a combustion of the material, but rather a type of carbonation occurs without the loss of dimensional stability, while maintaining some elasticity.

According to a third exemplary embodiment of the sealing plug according to the invention, the base wall and the first radially circumferential side wall connected thereto can be formed from a hard component, wherein an annular soft component is arranged on a region of the base wall facing in the direction of a closing side and is formed from the thermoplastic adhesive material.

According to the third exemplary embodiment, the soft component formed from the thermoplastic adhesive material forms the connecting region.

The sealing plug according to the invention according to the third exemplary embodiment is characterized in that the hard component carbonates at high temperatures.

In addition, the hard component forms a separating layer to PVC, thereby preventing plasticizer migration and related material damage. PVC can be used for additional sealing or a protection layer in the region of underbodies.

Fibers can be embedded into the hard component made of plastic.

Preferably, the material can comprise fibers, in particular reinforcing fibers, for increasing dimensional stability.

In particular, elongated glass fibers can be provided here.

Alternatively, the fibers can be plastic fibers or mineral fibers or other suitable fibers for increasing dimensional stability.

The hard component can preferably be made of the following materials or combinations of materials:
polyphthalamide (PPA) with carbon fibers;
polyamide 66 (PA66) with carbon fibers or fiberglass, optionally also radiation cross-linked;
polyethersulfone with glass fibers
polyphthalamide (PPA) with glass fibers, preferably with elongated glass fibers A radiation cross-linking can have a positive effect on the heat resistance and can increase the temperature range by 100° C.

A high proportion of long glass fibers also has a positive effect, so that other plastics can also be suitable in such a glass fiber.

Furthermore, the hard component prevents free KTL surfaces from being created or exposed by a shrinking of the material of the sealing plug in a component.

In particular, the hard component forms a "protection shield" for thermal shielding of the soft component or for the thermoplastic adhesive material. The thermal protection shield for the soft component is thus carried out by the temperature-resistant, non-sealing hard component. Radially circumferential catching elements can be provided on the side wall for rearwardly engaging with an edge of a component that delimits a hole.

These catching elements, in conjunction with the soft component, generate high retaining forces while exerting a high bias on the sealing component and soft component, respectively.

This leads to better adhesion of the thermoplastic adhesive material to the component.

The catching elements can comprise one or more catching faces. In this manner, a plurality of catching steps are formed.

Due to the presence of different catching steps, the sealing plug is suitable for different sheet thicknesses. The pressing force can also be varied or adjusted.

Analogously to the above exemplary embodiments, the soft component or the thermoplastic adhesive material allows an axial sealing of the sealing plug against a hole of a component.

As in the first exemplary embodiment, it is also provided according to the second exemplary embodiment that the soft component or the thermoplastic adhesive material is connected to the respective component in an oven.

The resulting sheet adhesion of the thermoplastic adhesive material prevents a shifting of the hard component at higher temperatures.

Furthermore, analogously to the first exemplary embodiment, the soft component allows a reliable seal, even at high temperatures.

Due to the thermal shielding described above, such a sealing plug is also usable for higher temperatures above 600° C.

In addition, a method for producing the sealing plug according to the third exemplary embodiment is provided by means of a 2-component injection molding method. With regard to the thermoplastic adhesive material, these methods are carried out analogously to the method described above.

BRIEF DESCRIPTION OF THE DRAWINGS

The invention is explained in the following on the basis of two exemplary embodiments, as shown in the figures. The figures show:

FIG. 6 a perspective view of the sealing plug according to a third exemplary embodiment, and FIG. 7 a perspective detail view of a connecting region of the sealing plug.

DETAILED DESCRIPTION

Figure 1:
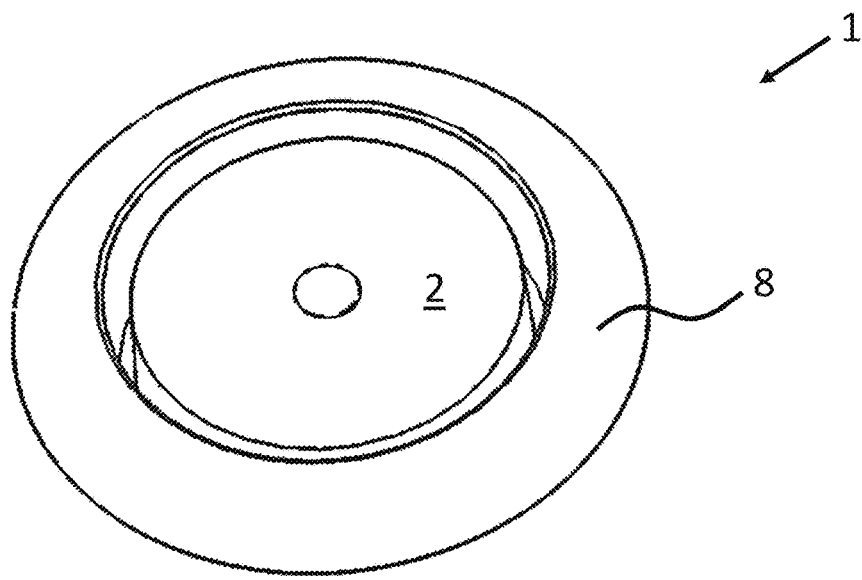
FIG. 1 a perspective view of a sealing plug according to the invention according to a first exemplary embodiment.
Figure 2:
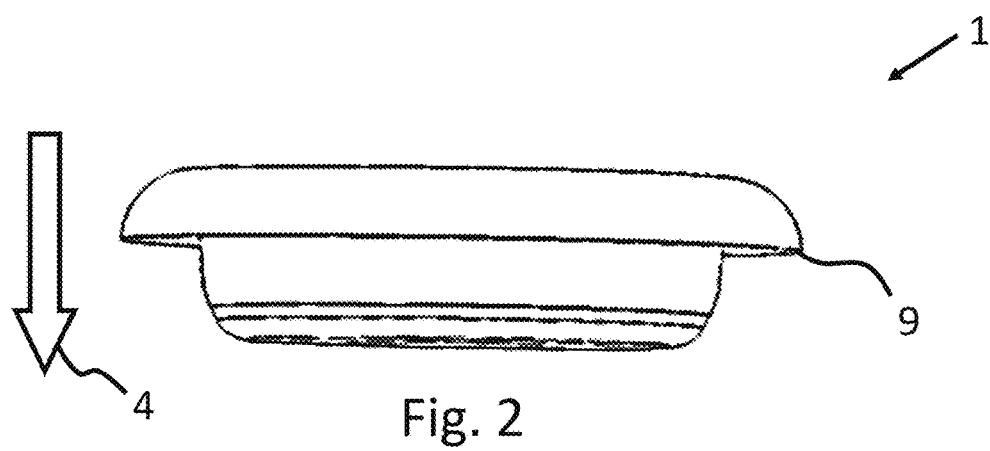
FIG. 2 a further perspective view of the sealing plug.
Figure 3:
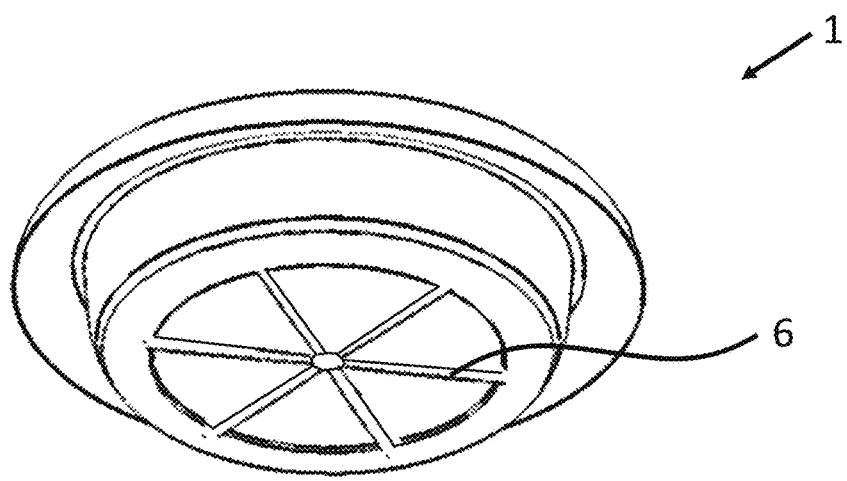
FIG. 3 a further perspective view of the sealing plug.
Figure 4:
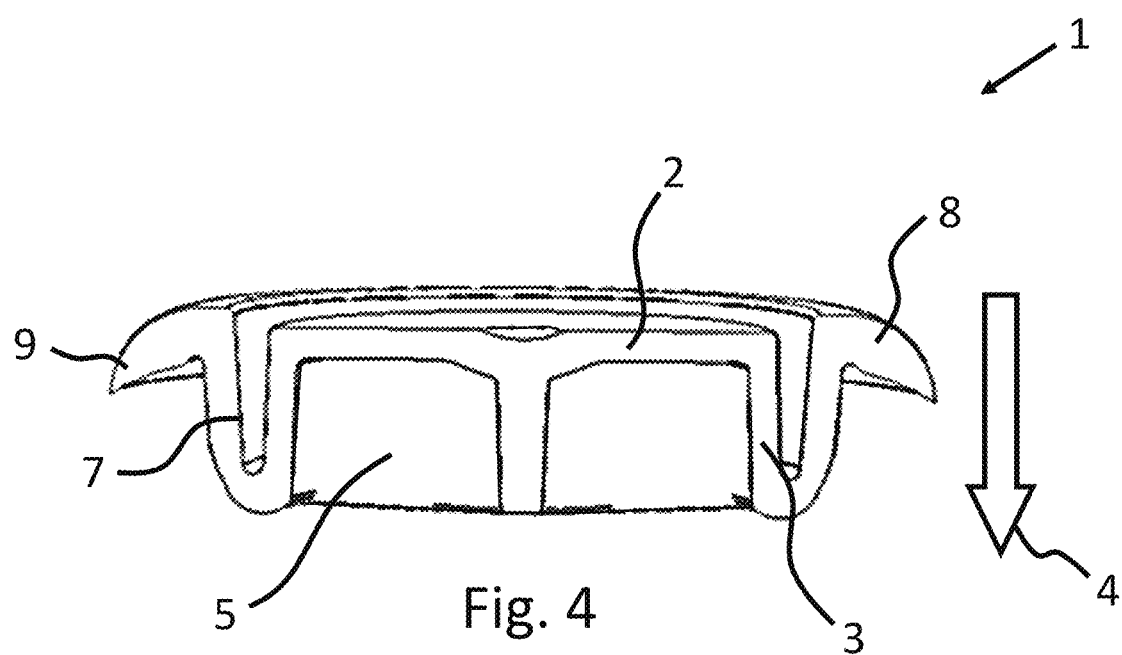
FIG. 4 a perspective laterally cut view of the sealing plug.

According to the invention, a sealing plug or high-temperature sealing plug 1 for closing holes in objects, in particular for closing holes in motor vehicles or in components of motor vehicles, preferably electric vehicles, such as an underbody, is provided (FIGS. 1 to 4).

The sealing plug 1 according to a first exemplary embodiment comprises a base wall 2 and a first circumferential side wall 3 connected thereto.

This sealing plug 1 is configured so as to be inserted into a through-opening of a component in an assembly direction 4.

In the context of the present invention, an "assembly direction" 4 is understood to mean a direction in which a high-temperature sealing plug 1 can be inserted into a hole or a through-opening of a component in order to close it. The assembly direction 4 thus extends approximately orthogonally to a region or edge of a component delimiting such a through-opening (hole).

The first side wall 3 thus delimits a cavity 5 and thereby forms a bowl-shaped reinforcing element.

The base wall 2 extends orthogonally to the first side wall 3 through the cavity 5 and thus forms a transverse wall, which is approximately circular in a plan view and corresponds to the shape of the cavity.

Furthermore, radially circumferential stiffening ribs 6, which are equally spaced apart from one another and extend through the cavity 5, are provided in the cavity 5. The stiffening ribs 6 thus connect diametrically opposite wall regions of the first side wall 3.

At the ends of the first side wall 3 opposite the base wall 2, a second radially circumferential side wall 7 is integrally formed.

The second side wall 7 is arranged approximately concentrically to the first side wall 3. In particular, the second side wall 7 can be conical in cross-section or tapered in the assembly direction.

At the end of the second side wall 7 opposite the connection to the first side wall 3, an annular flange portion 8 is integrally formed.

A sealing lip 9 extending radially outward and in the assembly direction 4 is provided radially on the flange portion 8. The sealing lip 9 is configured for the sealing abutment against an edge or face of a component that delimits a through-opening.

In the transition from the second side wall 7 to the flange portion 8, a radially circumferential, undercut recess 10 is provided. This undercut recess 10 is partially conical or circular in cross-section and increases the fitting accuracy and thus the retaining forces with which the high-temperature sealing plug 1 is retained in a through-opening of a component.

The present invention is characterized in that the high-temperature sealing plug is formed from a thermoplastic adhesive material based on styrene-ethylene-butylene-styrene (SEBS) such that the material carbonates at a temperature of up to 500° C., such that the sealing plug remains dimensionally stable and elastic.

A high-temperature sealing plug according to the invention, made of a thermoplastic adhesive material based on SEBS, is configured so as to carbonize the material at a temperature of up to 700°, such that the sealing plug does not melt and thus remains dimensionally stable and elastic.

In this manner, it is safely and reliably avoided that the material shrinks and/or forms cracks and/or holes, and thus can no longer close a corresponding hole or through-opening in a gas-tight manner.

Styrene-ethylene-butylene styrene (SEBS) is a thermoplastic elastomer (TPE). SEBS behaves like rubber, without the need for vulcanization. SEBS is strong and flexible, has excellent heat and UV resistance, and is easy to process. It is produced by hydrogenation of styrene butadiene styrene copolymer (SBS), thereby improving thermal stability, weather resistance, and oil resistance.

Thermoplastic elastomers, referred to as styrenic block copolymers (TPS or TPE-S), are compounds based on SBS or SEBS. In fact, the words SBS or SEBS are often used in order to describe these compounds or composite materials, although they are actually raw materials.

SBS is based on two-phase block copolymers with hard and soft segments. The styrenic end blocks provide the thermoplastic properties, and the butadiene mid-blocks provide the elastomeric properties.

SBS becomes SEBS upon hydrogenation, because the elimination of the C=C bonds in the butadiene component results in ethylene and butylene in the mid-block, hence the acronym SEBS. SEBS is characterized by improved heat resistance, mechanical properties, and chemical resistance.

Furthermore, fibers are embedded in the material or matrix material of the sealing plug according to the invention in order to increase the dimensional stability.

In particular, the material is TPS or TPE based on SEBS and has adhesive properties.

Thus, the sealing plug according to the invention is made of TPS or TPE based on SEBS with corresponding fibers and corresponding adhesive properties.

Preferably, the material comprises plastic fibers for increasing dimensional stability.

The fibers in the material ensure a very good dimensional stability, even at high temperatures.

The adhesive properties of the material prevent the sealing plug, in particular a corresponding sealing lip of the sealing plug, from detaching from the region of the component that delimits the through-opening, in particular an underbody, because the fusing can withstand temperatures of up to 600° C. The same applies when the high-temperature sealing plug is configured as a simple sealing plug or as an assembly plug.

Due to the adhesive properties, the sealing plug is held in place, and the adhesive properties simultaneously serve as a connection between the fibers.

Like other plastics, the high-temperature sealing plug according to the invention shrinks slightly during carbonation at temperatures up to 600° C. Nevertheless, the material properties shown above are sufficient to close a corresponding opening in a gas-tight manner.

Figure 5:
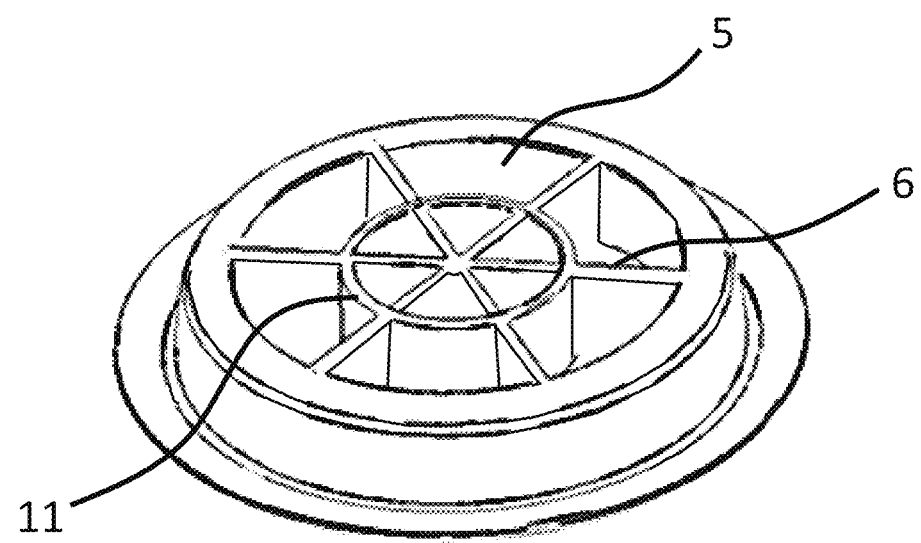
FIG. 5 a perspective view of the sealing plug according to a second exemplary embodiment.

According to a second exemplary embodiment (FIG. 5), which has the same technical features as the high-temperature closure plug 1 according to the first exemplary embodiment, an annular stiffening rib 11 is provided in addition to the stiffening ribs 6 in order to increase the dimensional stability, which is also arranged in the cavity 5 and extends concentrically to the first side wall 3.

In principle, the sealing plug can have an arbitrarily formed stiffening structure.

The high-temperature sealing plug 1 according to the first and second embodiments is made by a 1-component injection molding process from a heat-activatable adhesive material.

Furthermore, according to the invention, a method for producing a high-temperature sealing plug described above is disclosed, wherein the method is a 1-component injection molding method in which a shear required for melting SEBS is produced by an auger of an injection molding machine in order to melt the material.

Melting SEBS requires not only a specific temperature, but also a specific shear. This can be melted with the auger through an additional shear in an injection molding machine.

The use of SEBS provides the advantage, in particular, that temperatures of 600° C. do not cause a melting of the material, but rather a type of carbonation occurs without the loss of dimensional stability, while maintaining some elasticity.

In the following, a sealing plug 1 according to the invention according to a third exemplary embodiment is explained. Unless described otherwise, the sealing plug 1 according to the third exemplary embodiment has the same technical features as the sealing plug 1 according to the first and the second exemplary embodiment. Identical technical features bear the same reference numerals.

In the high-temperature sealing plug 1 according to the third exemplary embodiment, the base wall 2 and the first radially circumferential side wall 3 connected thereto are formed from a hard component 12.

The hard component is formed from a plastic embedded into the elongated glass fibers.

A soft component is formed on the base wall 2 and is made from the thermoplastic adhesive material described above. This material is TPS or TPE based on SEBS, which has adhesive properties.

The base wall 2 is disk-shaped or plate-shaped, wherein the radially circumferential first side wall 3 is rearwardly offset from a radial edge region of the base wall and in this way forms an annular abutting portion 14 for abutting a component.

Preferably, the base wall 2 is circular in form. Alternatively, the base wall 2 can be configured so as to correspond to the geometry of a hole to be closed, i.e., it can also be e.g., oval, elliptical, rectangular, or polygonal, etc.

The base wall 2 comprises a covering side 15 and a closing side 16 facing in the assembly direction 4. The closing side 16 faces in the direction of a component or in the direction of a hole to be closed.

On a radially outer edge of the abutting portion 14, a recess 17 for receiving the soft component 13 is formed on the closing side 16.

The soft component 13 formed from the thermoplastic adhesive material is configured in an annular fashion.

Furthermore, the side wall 3 comprises radially circumferential catching elements 18, which are arranged so as to be equally spaced apart from one another, for rearwardly engaging with an edge of a component delimiting a hole.

The catching elements 18 preferably comprise a plurality of locking surfaces 19, which thereby form corresponding catching steps.

Furthermore, according to the present invention, a method for producing the high-temperature sealing plug according to the third exemplary embodiment is provided by means of a 2-component injection molding method.

The soft component 13 or the thermoplastic adhesive material is produced analogously to the 1-component injection molding process described above.

According to an alternative embodiment of the present invention (not shown), the sealing plug is configured without side wall(s) and can be connected to a component without catching means.

The sealing plug can then be formed in a disk-shaped manner.

According to a further alternative embodiment of the present invention (not shown), the sealing plug is provided as a grommet apparatus for passing cables on a component opening. This comprises a cable passage portion and a radially circumferential connecting portion for connecting the grommet apparatus to an edge region of a component opening. The grommet apparatus is characterized in that the connecting portion has an inner and an outer stiffening wall, which are arranged substantially concentrically with respect to one another.

The grommet apparatus is formed from the material according to the invention described above.

The present invention thus relates to a grommet apparatus for the passage of lines, in particular for cable passage or for passing cable harnesses or also for passing fluid lines, e.g., coolant lines, through a component opening. A fluid line can be, for example, a cooling water line of a motor vehicle.

The connecting portion can comprise a sealing portion and a fastening portion.

The radially circumferential fastening portion can comprise catching means for rearward engagement of an edge of a component lying in the assembly direction.

The catching means can be configured as catching members and can have a catching edge arranged opposite to the assembly direction, wherein the catching members extend outward from the fastening portion in radial direction, and wherein the catching members are preferably arranged radially circumferentially at the same distance from one another and are preferably integrally formed on the grommet apparatus.

The sealing portion can have a radially circumferential sealing lip that extends substantially in the assembly direction. A reliable seal of the component opening by means of the grommet apparatus is achieved by means of the sealing lip.

The cable passage portion can be approximately funnel-shaped and extend counter to the assembly direction, wherein a cable passage opening is preferably approximately formed at the center of the cable passage portion. The cable passage portion is preferably delimited by the inner stiffening wall.

The cable passage portion can have approximately twice the length in the assembly direction or in the axial direction opposite to a base body of the apparatus. The base body is the connecting portion with the sealing portion and the fastening portion as well as the inner and outer stiffening walls along with the corresponding struts.

LIST OF REFERENCE NUMERALS

1 High-temperature sealing plug
2 Base wall
3 First side wall
4 Assembly direction
5 Cavity
6 Stiffening rib
7 Second side wall
8 Flange portion
9 Sealing lip
10 Undercut recess
11 Coaxial stiffening rib
12 Hard component
13 Soft component
14 Abutting portion
15 Covering side 16 Closing side
17 Recess
18 Catching element
19 Catching faces

The invention claimed is:

1. A sealing plug, for closing holes in objects, comprising a base wall, and
at least one first radially circumferential side wall connected to a closing side of the base wall and extending axially from the base wall in an assembly direction,
wherein the sealing plug is comprised at least in regions by a thermoplastic adhesive material based on styrene-ethylene-butylene-styrene;
wherein the base wall and the first radially circumferential side wall are formed by a first component of a first material,
wherein an annular component is arranged on an annular surface region of the closing side of the base wall facing in the assembly direction such that an entirety of the annular component is axially backed by the annular surface region of the base wall,
wherein the annular component is comprised by the thermoplastic adhesive material and the thermoplastic adhesive material is softer than the first material;
wherein radially circumferential catching elements are provided on the side wall, each radially circumferential catching element including at least one locking surface facing toward the base wall for engaging with an edge of a component that delimits a hole;
wherein the annular surface region of the closing side of the base wall extends to an outer peripheral edge of the base wall and comprises a peripheral recess in the base wall,
wherein a thickness of the base wall along the peripheral recess is less than a thickness of the base wall radially inward of the peripheral recess,
wherein the peripheral recess extends to the outer peripheral edge of the base wall.

2. The sealing plug according to claim 1, wherein the thermoplastic adhesive material is a thermoplastic elastomer styrenic block copolymer based on styrene-ethylene-butylene-styrene and has adhesive properties.

3. The sealing plug according to claim 1, wherein the base wall and the side wall form a bowl shape, which delimits a cavity, wherein a stiffening structure is arranged in the cavity.

4. The sealing plug according to claim 1,
wherein fibers for increasing the dimensional stability are embedded into the thermoplastic adhesive material and/or fibers for increasing the dimensional stability are embedded into the first material.

5. A method for manufacturing a sealing plug according to claim 1, wherein the method is a 1-component or 2-component injection molding process.

6. The sealing plug according to claim 1, wherein the thermoplastic adhesive material is a hot-melt adhesive material, wherein each radially circumferential catching element includes a plurality of locking surfaces that form a plurality of catching steps.

7. The sealing plug of claim 1, wherein the base wall is planar along the outer peripheral edge.

8. The sealing plug of claim 1, wherein the annular component is positioned in the peripheral recess such that the outer peripheral edge of the base wall extends from an outer peripheral edge of the annular component and in a direction counter to the assembly direction.

9. The sealing plug of claim 1, wherein the outer peripheral edge of the base wall extends from an outer side of the peripheral recess in a direction counter to the assembly direction.

10. The sealing plug of claim 1, wherein the outer peripheral edge of the base wall is offset, in a direction counter to the assembly direction, relative to the closing side of the base wall radially inward of the peripheral recess.

11. A sealing plug, for closing holes in objects, comprising a base wall, and
at least one first radially circumferential side wall connected to a closing side of the base wall and extending axially from the base wall in an assembly direction,
wherein the sealing plug is comprised at least in regions by a thermoplastic adhesive material based on styrene-ethylene-butylene-styrene;
wherein the base wall and the first radially circumferential side wall are formed by a first component of a first material,
wherein an annular component is arranged on an annular surface region of a peripheral recess located at the closing side of the base wall, the annular surface region facing in the assembly direction such that an entirety of the annular component is axially backed by the peripheral recess of the base wall,
wherein the annular component is comprised by the thermoplastic adhesive material and the thermoplastic adhesive material is softer than the first material;
wherein radially circumferential catching elements are provided on the side wall, each radially circumferential catching element including at least one locking surface facing toward the base wall for engaging with an edge of a component that delimits a hole;
wherein the peripheral recess begins at an outer peripheral edge of the base wall and extends radially inwardly therefrom, such that the outer peripheral edge of the base wall is offset, in a direction counter to the assembly direction, relative to the closing side of the base wall radially inward of the peripheral recess.

* * * * *